Dec. 15, 1964  F. M. EXNER  3,161,050

LIQUID LEVEL APPARATUS

Filed Oct. 4, 1962

INVENTOR.
FRANK M. EXNER
BY
ATTORNEY

United States Patent Office 3,161,050
Patented Dec. 15, 1964

3,161,050
LIQUID LEVEL APPARATUS
Frank M. Exner, Minneapolis, Minn., assignor to Honeywell Inc., a corporation of Delaware
Filed Oct. 4, 1962, Ser. No. 228,419
5 Claims. (Cl. 73—295)

The present invention is concerned with an improved liquid level apparatus and particularly with a liquid level apparatus which is constructed and arranged to facilitate the locating of the interface of the liquid contained within a sealed container, the apparatus of the present invention facilitating the measurement of this interface without the necessity of providing means located within the container.

A familiar problem present in the art of liquid level measuring is the measurement of liquids within sealed containers, particularly when these containers contain a corrosive liquid preventing the use of floats or probes located within the container. While the present invention is not limited to this particular environment, it has particular utility in this environment. The prior art features various means, such as the use of radiation sources and radiation sensitive devices located exterior the tank, to accurately measure liquid level. The present invention, however, is concerned with providing the same end result with an inexpensive structure.

Specifically, the present invention contemplates the use of an electrically energizable heater coil or wire which may be cemented to the outside surface of the liquid tank. This heater coil provides a heated zone in the tank surface. The tank surface adjacent this heated zone experiences a temperature gradient, which temperature gradient is larger above the liquid surface. At the interface of the liquid, the temperature gradient changes abruptly between that experienced generally above the liquid and that experienced generally below the liquid.

Broadly, the present invention contemplates the use of means to sense this temperature gradient and the use of associated electrical circuitry to "find" the material interface.

Specifically, as an embodiment the structure of the present invention provides spaced differential thermocouples which move up and down along the length of the tank adjacent the heater coil to sense this temperature gradient and specifically to sense the change in the temperature gradient at the interface of the liquid. Thus, the position of the thermocouples, at the interface, is indicative of the liquid level within the container.

The apparatus of the present invention will be apparent to those skilled in the art upon reference to the following specification, claims and drawings, of which:

Figure 1:
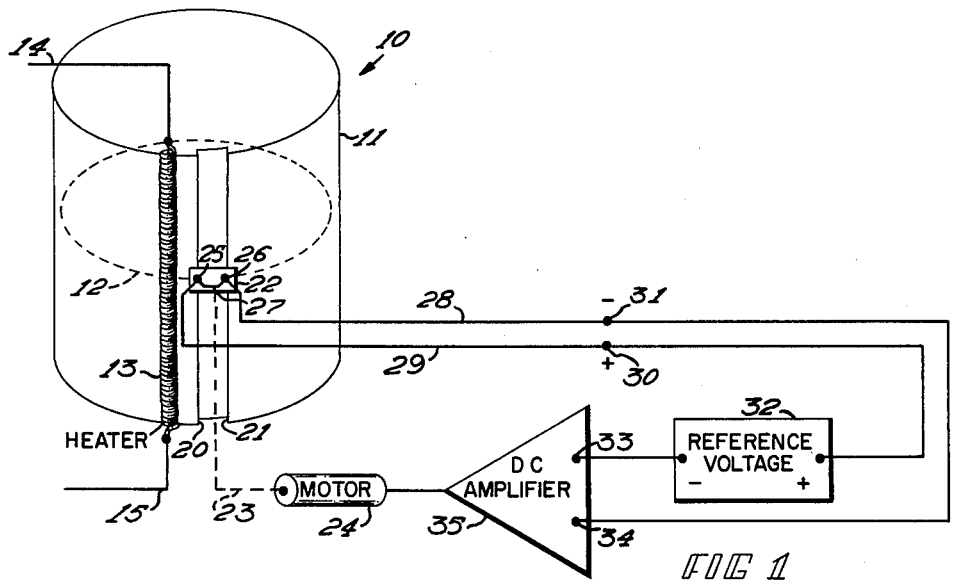
FIGURE 1 is a showing of an embodiment of my invention.

Referring to FIGURE 1, reference numeral 10 designates generally a liquid container having an outer wall 11 and containing liquid whose interface is identified generally by means of reference numeral 12. Container 10 is shown as a sealed container. My invention is not, however, limited to the use of a sealed container.

Mounted on an exterior portion of the wall 11 is an elongated strip heater 13, consisting of an electrical heating element whose end terminals are connected, by means of conductors 14 and 15, to be continuously energized from a source of voltage, not shown. Heater 13, which may be electrically insulated from the wall 11 of the tank, is placed in intimate heat transfer relation with the wall and produces a heated zone generally beneath the heater 13. Heater 13 is shown as an elongated heater which extends generally in a vertical direction, normal to interface 12.

The heat provided by heater 13, and the heated zone of the wall 11 immediately beneath heater 13, provides a temperature gradient which extends horizontally along wall 11, in both directions from heater 13. Thus the temperature of wall 11 at a first point immediately adjacent heater 13 is higher than that at a second point on the wall which is spaced a greater distance from the heater than is the first point. Furthermore, the temperature difference between two such points is greater above interface 12 than it is below interface 12. This result is achieved by virtue of the fact that below interface 12 the liquid is in intimate contact with the interior surface of wall 11 and conducts heat away from the heated portion of the wall beneath heater 13. Thus, the wall is in effect cooled by the liquid and the temperature gradient at spaced points extending away from heater 13 is lower below interface 12 than it is above interface 12. Above interface 12, the air or medium above the liquid is in intimate contact with the interior of wall 11. However, this medium does not conduct heat away from the wall to as great an extent as the liquid.

The above explanation deals exclusively with the case in which the liquid or medium below interface 12 has a greater heat conductivity than does the medium above interface 12.

Reference numerals 20 and 21 identify a pair of tracks, rails or guides, along which a structural member 22, mounting a pair of spaced thermocouples, may be moved by means of a mechanical coupling represented by means of the broken line 23 which is connected to the reversible electrical motor 24. Specifically, the guides 20 and 21 are coupled by conventional means, to support a block-like member 22 to be selectively driven, either up or down, in accordance with the direction of rotation of motor 24.

Mounted on member 22 are a pair of spaced thermocouples which are shown positioned at interface 12, this being the rest or stable position of the apparatus of FIGURE 1. The thermocouples, identified by reference numerals 25 and 26, consist of a common electrical conductor 27, which may be formed of iron, and of further electrical conductors 28 and 29, which may be formed of constantan. The thermocouple formed by members 27 and 29 is the "hot" thermocouple, while the thermocouple formed by members 27 and 28 is the "cold" thermocouple. In other words, the temperature of that portion of wall 11 which is more closely associated with heater 13 is hotter than is that portion of the wall which is further spaced from the heater 13. Thus, as thermocouples 25 and 26 move up and down, they experience a voltage output at terminals 30 and 31 whose magnitude is determined by the temperature gradient experienced by the thermocouples.

The connection of these thermocouples is such that the polarity of the voltage at terminals 30 and 31 is of the polarity indicated in FIGURE 1 wherein terminal 30 is positive and terminal 31 is negative. However, the magnitude of this voltage changes as the thermocouples are moved from one temperature gradient to another. For example, this voltage is of a high magnitude when the thermocouples are above interface 12, is of a low magnitude when below interface 12, and is of an intermediate magnitude when the thermocouples are positioned at the interface.

Reference numeral 32 designates a reference voltage source of constant magnitude and of a polarity as indicated. This reference voltage source 32 is connected in series opposition to the terminals 30 and 31 of the thermocouples and to the input terminals 33 and 34 of a D.C. amplifier 35 whose output is connected to control motor 24. The magnitude of reference voltage source 32 is selected to be substantially equal, within the differential control range of D.C. amplifier 35, to the output of thermocouples 25 and 26 when these thermocouples are positioned at interface 21. Thus, the D.C. amplifier experiences no input control voltage and motor 24 maintains the thermocouples at the interface. However, if the liquid level should rise, then the temperature differential experienced by thermocouples 25 and 26 will decrease and the voltage present at terminals 30 and 31 will decrease. The result is to provide a negative-to-positive control voltage to the input terminals 33 and 34 of D.C. amplifier 35. This control voltage is effective to cause energization of motor 24 to run this motor in such a direction as to raise the thermocouples to the new interface.

In the event that the liquid level should drop within container 10, then the temperature differential experienced by thermocouples 25 and 26, now above the interface 12, is increased and the voltage at terminals 30 and 31 increases. The effect of this change is to provide a positive-to-negative input signal at terminals 33 and 34 of D.C. amplifier 35 and as a result the reversible motor 24 is driven in a reverse direction to lower the thermocouples 25 and 26 to the new interface. As a result, the position of thermocouples 25 and 26, and the corresponding position of motor 24, is a measurement of the liquid level within the container 11. This liquid level may be indicated at a variety of displays or may be utilized as an electrical signal, for example, an auxiliary potentiometer may be driven by motor 24 as the thermocouples 25 and 26 are moved.

While the above explanation has dealt exclusively with the use of thermocouples, it is recognized that temperature sensitive resistors, connected into a suitable voltage source to provide a corresponding voltage at terminals 30 and 31, may be utilized in place of thermocouples 25 and 26, if desired.

Figure 2:
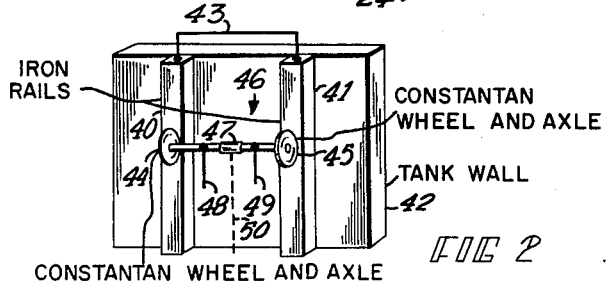
FIGURE 2 is a showing of a thermocouple arrangement which may be used in the environment of the showing of FIGURE 1.

The modification of FIGURE 2 discloses an arrangement whereby iron rails 40 and 41 are shown mounted on the tank wall 42 and are interconnected by an electrical conductor 43. Mating with the iron rails are a pair of constantan wheels 44 and 45 which are connected to a common axle 46, this constantan axle having an insulating portion 47, and each wheel being connected to an electrical conductor 48 and 49. The broken line 50 represents the mechanical connection whereby the wheels 44 and 45 are raised or lowered, the wheels contacting the iron rails to form two thermocouples which may be connected to the terminals 30 and 31 respectively of FIGURE 1.

Figure 3:
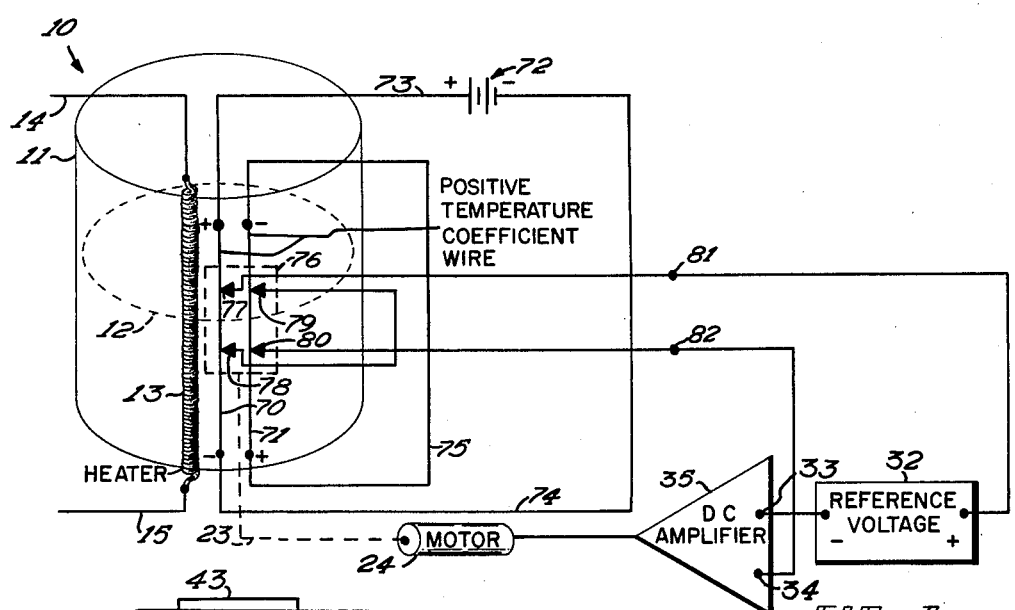
FIGURE 3 is a showing of a further embodiment of my invention utilizing temperature sensitive resistance wire.

As a further embodiment of my invention, FIGURE 3 shows a construction utilizing a pair of identical positive temperature coefficient wires identified by reference numerals 70 and 71. These wires are positioned adjacent heater 13, much the same as the members 20 and 21 of FIGURE 1. The interface of the liquid, identified by reference numeral 12, is again located at an intermediate portion of the tank 10. The wires 70 and 71 are connected to a source of voltage 72 by means of a circuit which can be traced from the positive terminal of this source of voltage through a conductor 73, wire 70, conductor 74, wire 71 and conductor 75 to the negative terminal of the source of voltage 72.

Source of voltage 72 preferably is a stable source of voltage having a constant output voltage. Slightly greater accuracy can be achieved by utilizing a source 72 having a constant current output since, as will be apparent, the operation of the embodiment of FIGURE 3 utilizes means which senses the change of resistance of the positive temperature coefficient wires 70 and 71 as these wires are subjected to the temperature gradient established by heater 13.

By way of explanation, the wall 11 of tank 10 which is generally located above the liquid interface 12 will be hotter than a corresponding position, with respect to heater 13, which is below interface 12. Thus, per unit length of the wires 70 and 71, a higher resistance exists above interface 12 than below the interface. Therefore, when traveling down wire 70 from the top of the tank to the bottom, an incremental distance of travel above the interface results in a change in voltage which is higher than the same incremental distance of travel below the interface.

Furthermore, since wire 71 is located a further distance from heater 13 than is wire 70, the same incremental travel along wire 71, from the top of the tank toward the bottom of the tank, results in a somewhat lower voltage change being experienced since at a lower temperature wire 71 has a lower incremental resistance along its length. However, as with wire 70, the incremental change in voltage (and likewise resistance) for wire 71 is greater above interface 12 than below the interface.

The apparatus of FIGURE 3 utilizes the above principle to sense or detect the temperature gradient established by heater 13. Specifically, reference numeral 76 identifies a mounting member which is diagrammatically shown as coupled to the linkage 23 controlled by motor 24, this motor in turn being controlled by D.C. amplifier 35. Physically mounted on member 76, and movable up and down therewith, are four slide wire contacts having a fixed vertical spacing, these slide wire contacts being identified by reference numerals 77, 78, 79 and 80.

As will be apparent, slide wires 77 and 78 constitute a voltage source, picking off the incremental voltage existing across that portion of wire 70 which is bridged by the slide wires 77 and 78. Likewise, slide wires 79 and 80 constitute a further voltage source, this voltage source being the voltage existing across the portion of wire 71 which is bridged by the slide wires 79 and 80.

In the operation of the apparatus of FIGURE 3, the voltage existing at a pair of terminals 81 and 82 is compared to that of a reference voltage source 32. This can be seen by tracing a circuit from the input terminal 33 of amplifier 35 through input voltage source 32 (a voltage rise), terminal 81, slide wires 77 and 78 (a voltage drop), slide wires 79 and 80 (a voltage rise), and terminal 82 to the input terminal 34 of the amplifier. Since wire 70 is located closer to heater 13 than is wire 71, the voltage drop existing between slide wires 77 and 78 is of a higher magnitude than is the voltage rise existing between slide wires 79 and 80. In the above traced circuit, the voltage rise between slide wires 79 and 80 is connected in series aiding relationship to the voltage rise of the voltage reference source 32. The sum of these two voltage rises is such as to counterbalance the voltage drop existing between slide wires 77 and 78 and with the member 76 positioned at the interface, as shown in FIGURE 3, the apparatus is at a stable condition indicative of the position of the interface.

If it is assumed that the level of the liquid within the container 10 lowers, to lower the position of interface 12 then while the temperature of both the wires 70 and 71 increases, the temperature of wire 70 increases to a greater extent. Thus the temperature drop existing between slide wires 77 and 78 is effective in the above traced circuit to cause motor 24 to run in a direction to lower member 76 to the interface.

If it is assumed that the level of the liquid within container 10 rises, to raise the position of interface 12, then the opposite effect occurs. In other words, the temperature of the bridged portion of wires 70 and 71 decreases. The temperature gradient in the wall of container 10 below interface 12 is relatively low and thus wires 70 and 71 are more nearly at the same temperature. As a result, the respective voltage drop and voltage rise of the wires 70 and 71 tend to cancel each other and voltage reference source 32 remains as the predominant voltage in the above traced circuit. Voltage reference source 32 is effective to apply an opposite polarity voltage to the input terminals 33 and 34 of D.C. amplifier 35. As a result, motor 24 is energized to rotate in a direction to lift member 76 to the new interface, again seeking the equilibrium position of the interface wherein the magnitude of the voltage drop present between slide wires 77 and 78 is approximately equal to the sum of the voltage rise between slide wires 79 and 80 and the voltage rise of voltage reference source 32.

It is recognized that other modifications of the present invention will be apparent to those skilled in the art. For example, it is possible that the apparatus of FIGURE 1 may be utilized to measure the level of a material at the lower portion of a container, which material has lower heat conductivity than does the air or medium above the material. In this case, the operation of D.C. amplifier 35 will be reversed to produce movement of thermocouples 25 and 26 in an upward direction upon experiencing a greater temperature differential. Such modifications are within the teachings of the present invention and it is intended that the scope of this invention be limited solely by the scope of the appended claims.

I claim as my invention:

1. Liquid level apparatus for use in measuring the height of liquid in a container, comprising;
   a continuously energized electrical heater mounted on the liquid container along the height thereof to produce a heated zone on the container,
   a pair of temperature sensitive devices spaced from each other in a direction normal to the border of said heated zone,
   and means movably mounting said temperature sensitive devices along the height of the container in said heated zone to respond to the temperature differential in the liquid container wall adjacent said heated zone.

2. Liquid level measuring apparatus for use in measuring the level of liquid in a container, comprising;
   a continuously energized electrical heater mounted along the height of the container in heat transfer relationship therewith to establish a heated zone along the height of the container, the container wall thereby having a temperature gradient at portions of the wall which are spaced from said heated zone, said temperature gradient being greater at portions of said wall above the interface of the liquid which is within the container,
   a pair of thermocouples,
   means movably mounting said thermocouples for movement along said heated zone with said thermocouples spaced unequal distances from said heater to thereby experience different temperatures within said temperature gradient,
   and means responsive to the thermocouple voltage signal produced by the temperature difference between said thermocouples to effect movement of said thermocouples along said heated zone.

3. Liquid level measuring apparatus for use in measuring the height of the liquid interface in a container, comprising;
   a continuous strip heater mounted generally vertically on the wall of the container and to thereby establish a temperature gradient within the portion of the container wall which is adjacent said heater, the temperature gradient being of a higher magnitude above the liquid interface than below the liquid interface,
   a pair of series connected thermocouples movably mounted in horizontally spaced relationship and in heat transfer engagement with said portion of the container wall which is adjacent said heater,
   reference voltage means,
   voltage polarity responsive means,
   circuit means connecting said thermocouples and said reference voltage means in series opposition to said voltage responsive means to apply a reversible polarity voltage to said voltage responsive means as said thermocouples are positioned above or below the liquid interface,
   and motive means connected to be controlled by said voltage responsive means and to move said thermocouples along the container wall to seek the liquid interface.

4. In combination, a liquid container,
   a continuous strip heater mounted on the exterior wall of said container and extending from a lower portion to an upper portion of said container wall, to thereby produce a heated zone between said portions of said container wall and to produce a temperature gradient in said wall adjacent said heated zone,
   a first and a second rail of a first thermocouple metal mounted adjacent said heater and spaced unequal distances therefrom to thereby space each of said rails at a different temperature within said temperature gradient,
   circuit means electrically connecting said rails,
   a first and a second wheel of a second thermocouple metal mounted to individually engage and move along said first and second rail respectively to thus form a first and a second thermocouple,
   motor means coupling said wheels for concurrent movement along said rails,
   a source of reference voltage,
   and means connecting said source of reference voltage in series to said first and second wheel and to said motor means.

5. Liquid level measuring apparatus for use in measuring the height of the liquid interface in a container, comprising;
   a continuously energized electrical heater mounted along the height of the container in heat transfer relationship therewith to establish a heated zone along the height of the container, the container wall thereby having a temperature gradient at portions of the wall which are spaced from said heated zone, said temperature gradient being greater at portions of said wall above the interface of the liquid which is within the container,
   a first and a second wire of positive temperature coefficient,
   means mounting said first and second wire on said container wall and along said heater at spaced unequal distances from said heater, whereby said wires experience different temperatures within said temperature gradient,
   a source of electrical current,
   means connecting said first and second wires in series to said source of electrical current to thereby establish an electrical potential gradient along the length of said wires in accordance with the incremental resistance of the wires, which in turn is controlled by the temperature of the wires,
   and slide wire means movably connected to said wires and responsive to the electrical potential gradient along said wires to effect movement of said slide wire means along said heated zone.

References Cited by the Examiner

UNITED STATES PATENTS

| | | | |
|---|---|---|---|
| 1,833,112 | 11/31 | Harrison | 73—295 X |
| 1,942,241 | 1/34 | Duhme. | |
| 2,091,303 | 8/37 | Brelsford | 73—290 |
| 2,683,371 | 7/54 | Droin et al. | 73—290 X |

FOREIGN PATENTS 772,048  4/57  Great Britain.

ISAAC LISANN, *Primary Examiner.*